(No Model.)
H. W. KELLOGG.
INSTANTANEOUS SHUTTER FOR CAMERAS.
No. 315,296. Patented Apr. 7, 1885.
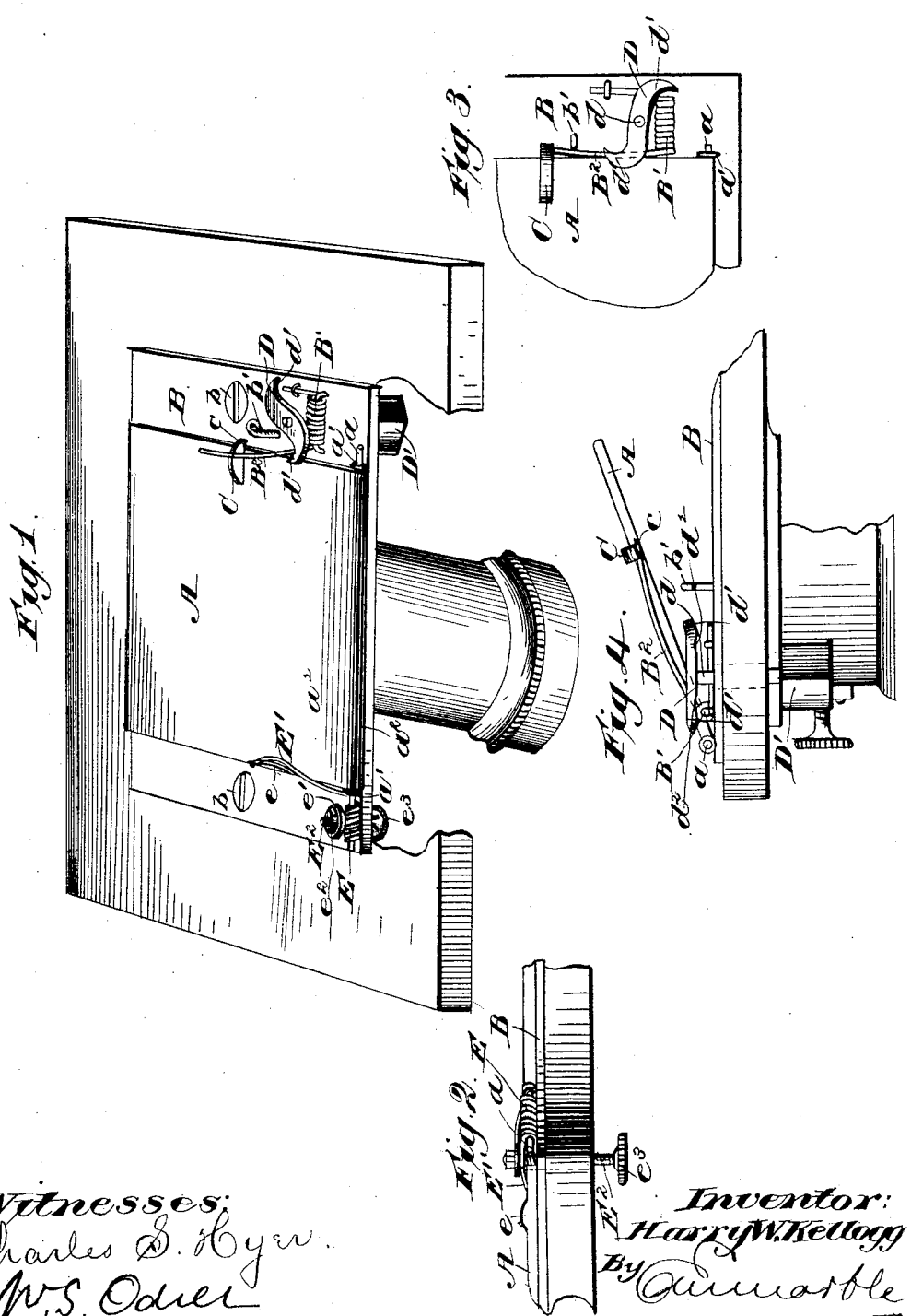

UNITED STATES PATENT OFFICE.

HARRY W. KELLOGG, OF GREENFIELD, MASSACHUSETTS.

INSTANTANEOUS SHUTTER FOR CAMERAS.

SPECIFICATION forming part of Letters Patent No. 315,296, dated April 7, 1885.

Application filed July 12, 1884. (No model.)

*To all whom it may concern:*

Be it known that I, HARRY W. KELLOGG, a citizen of the United States, residing at Greenfield, in the county of Franklin and State of Massachusetts, have invented certain new and useful Improvements in Instantaneous Shutters for Cameras, of which the following is a specification, reference being had therein to the accompanying drawings.

My invention relates to an instantaneous shutter for photographers' cameras for photographing objects while in motion; and it consists of a light door which is operated by two springs of unequal resiliency, acted upon by a cam, and so constructed that when one is released and opens the shutter the other immediately closes it.

The object of my device is to construct a photographer's camera which shall be easily handled, and one in which the incumbrance of the tripod can be readily done away with, as my device can be operated while being held in the hand or be rested on any suitable base, and one in which the exposure will be regulated as desired.

The exact construction of my shutter is shown in the accompanying drawings, in which Figure 1 is a perspective view of my shutter and its mechanism as it is applied to the inside of the lens end of a camera. Fig. 2 is an elevation of the shutting-spring and its tension device. Fig. 3 is a plan view of the cam and opening-spring, the spring-finger being in position to throw the shutter open. Fig. 4 is an elevation of part of the cam side of the camera, showing the cam and spring-shutter half open and the thumb-nut for operating the cam.

Like letters indicate similar parts throughout the several views.

A indicates the shutter which is hinged at its lower side by means of a pintle-rod, $a$, passing through staples $a'$ $a'$ and the rolled metal portion $a^2$ at the said lower side of the shutter. The metal portion $a^2$ is a continuation of the metal lining on the inside of the shutter A.

B represents a metal plate upon which is mounted the door A, and all the working mechanism pertaining thereto. This metal plate B is fastened to the front of the camera-box by means of the screws $b$ $b$. On one side of this plate B the opening mechanism is mounted, and on the other side the shutting device.

The opening mechanism consists, essentially, of a coiled spring, B', secured to the metal plate B by means of a staple passing through the coil, and its ends being riveted to the plate. This spring has extending from one side an arm or finger, $B^2$, which engages with a lug, C, rigidly fixed on the door A. This lug C extends a short distance beyond the outer edge of the door A and has its under side slightly grooved, as at $c$, for the reception of the finger $B^2$ of the spring B'. This spring-finger $B^2$ is actuated by means of a cam, D, which is mounted on a short spindle, $d$, passing through the metal plate B and the front of the camera-box, and has secured to its outer end a thumb-nut, D'. This cam D operates at either of its ends $d'$ $d'$ to actuate the spring-finger $B^2$ in setting and releasing it, there being on the under side like grooves $d^2$ $d^2$, to retain and draw the spring to its groove $c$ in the lug C on the light-door A. A guard-pin, $b'$, is also used in conjunction with this opening mechanism to prevent the spring-finger $B^2$ from slipping away from the grasp of the cam D.

On the other side of the shutter the closing device is mounted, and consists of a coiled spring, E, of less resiliency than spring B'. This spring E is mounted on an extended end of the pintle-rod $a$, and has also a finger or arm, E', extending from one side and engaging with the shutter or light-door A, being held in position by a projection or flange, $e$, fixed on the shutter. The other end of the coiled spring E is attached to a tension-screw, $E^2$, being held in place by a metal washer, $e'$, which is confined on the top of the screw $E^2$ by means of a nut, $e^2$. This screw has its bearing in a metal casing extending through the front of the camera-box, and has on its outer end a milled head, $e^3$, as is usual, for regulating the tension of the coiled spring and its finger, and by this construction the flash of light can be of long or short duration, as may be desired.

The operation of my device is obvious. The sensitized plate having been placed in its proper position, the operator turns the thumb-nut D', which, in turning, actuates the cam D, and by the construction of the cam operates to draw the arm or finger B² under the lug C on the shutter A.

The operation of the spring-finger B² is as follows: By turning the thumb-nut D' the cam D on its inside end grasps the spring-finger B², drawing it over the lug C on the door A, until it reaches the under side of the projecting portion c of said lug C. The cam D will still, however, be in contact with the spring arm or finger B², and, by turning the thumb-nut D' still farther until the outside edge of the cam D is released entirely from contact with said spring-finger B², the spring-finger is allowed to act by its resilient force exerted through the medium of its coil B'. The door A is immediately thrown open, the force of the spring-finger B² and its coil B' being greater than that of coil E and its finger E' composing the closing device; but as the spring-finger B² springs back it flies away from contact with the extended portion c of the lug C, entirely disengaging itself, thereby leaving the closing-finger E' with its coil E to act to close the door A without any resistance from the opening device. The spring-finger is now set, and by continuing to turn the thumb nut or button, owing to the eccentric relation between the spring-finger and the cam the spring is released, and thus left to act with its own resiliency, and the shutter is immediately forced open. At the same time the spring-arm E' of the shutting mechanism closes the shutter, being in continuous contact therewith, and thus an instantaneous flash of light is thrown upon the sensitized plate. The length of the flash is regulated by the tension-screw E²; but when a full light is desired, the spring-arm E' is released entirely from the shutter by lifting it and placing it in contact with the plate B.

It will be readily seen that I gain a great advantage by hinging the shutter at its lowermost portion, instead of at one side. By this arrangement I can give the top of the plate or ground a longer exposure than the sky, a very desirable thing in field and landscape photography, as the ground naturally takes too dark. At the under side of the shutter I place a lining of any suitable soft material, to avoid jarring, and at the same time render the shutter light-proof.

By my device I also gain a preventative against accidental exposure, as is a common though ruinous occurrence in photography.

Having thus described my invention, what I claim as new, and desire to secure by Letters Patent, is—

1. In a photographer's camera, the combination, with an instantaneous shutter, of an opening-spring mechanism and a closing tensioned spring, said springs being of unequal resiliency, and situated at opposite sides of the door, substantially as described.

2. In a photographer's camera, the combination, with an instantaneous shutter hinged at its lower side, of a self-setting exposing device, consisting of a coiled spring having a spring-finger, which, acting eccentrically with a cam operated by a thumb-nut, is brought into engagement with the under side of a lug rigid on the shutter, and the closing mechanism, substantially as described.

3. In a photographer's camera, the combination, with an instantaneous shutter having a self-setting exposing device, of a closing mechanism consisting of a coiled spring, E, having a spring-finger, E', extending from the main coil and engaging with the lug or projection e on the shutter, and a tension-screw, E², for varying the exposure, substantially as described.

4. In a photographer's camera, the combination, with an instantaneous-flash shutter or light-door hinged at its lower side, of the opening and closing devices situated at opposite sides of the bottom of the door, and acting conjointly, a thumb-nut for operating said opening and closing devices, and a metal plate upon which the shutter and all the operating mechanism is mounted, substantially as described.

In testimony whereof I affix my signature in presence of two witnesses.

HARRY W. KELLOGG.

Witnesses:
 FRANCIS M. THOMPSON,
 MARY E. MINER.